United States Patent
Todd et al.

(10) Patent No.: US 8,255,611 B1
(45) Date of Patent: *Aug. 28, 2012

(54) METHODS AND APPARATUS FOR ACCESSING CONTENT

(75) Inventors: Stephen J. Todd, Shrewsbury, MA (US); Philippe Armangau, Acton, MA (US)

(73) Assignee: EMC Corporation, Hopkinton, MA (US)

(*) Notice: Subject to any disclaimer, the term of this patent is extended or adjusted under 35 U.S.C. 154(b) by 1032 days.

This patent is subject to a terminal disclaimer.

(21) Appl. No.: 11/540,162

(22) Filed: Sep. 29, 2006

Related U.S. Application Data

(63) Continuation of application No. 11/474,658, filed on Jun. 26, 2006.

(51) Int. Cl.
G06F 12/08 (2006.01)
G06F 15/167 (2006.01)

(52) U.S. Cl. ......... 711/1; 709/203; 709/212; 709/216; 709/217; 709/219; 711/101; 711/108; 711/114; 711/202; 711/203

(58) Field of Classification Search ........... 709/203, 709/214; 707/100; 711/6, 100, 114, 203
See application file for complete search history.

(56) References Cited

U.S. PATENT DOCUMENTS

| | | | |
|---|---|---|---|
| 6,516,320 B1* | 2/2003 | Odom et al. | 707/101 |
| 6,757,778 B1* | 6/2004 | van Rietschote | 711/6 |
| 7,236,987 B1* | 6/2007 | Faulkner et al. | 707/104.1 |
| 7,383,381 B1* | 6/2008 | Faulkner et al. | 711/114 |
| 7,478,221 B1* | 1/2009 | Karr et al. | 711/203 |
| 2002/0035595 A1* | 3/2002 | Yen et al. | 709/203 |
| 2003/0236850 A1* | 12/2003 | Kodama | 709/214 |
| 2005/0010792 A1* | 1/2005 | Carpentier et al. | 713/193 |
| 2005/0091469 A1* | 4/2005 | Chiu et al. | 711/203 |
| 2005/0125625 A1* | 6/2005 | Kilian et al. | 711/202 |
| 2006/0074941 A1* | 4/2006 | Flynn et al. | 707/100 |

* cited by examiner

*Primary Examiner* — Kevin Bates
*Assistant Examiner* — Robert B McAdams
(74) *Attorney, Agent, or Firm* — Muirhead and Saturnelli, LLC

(57) ABSTRACT

One embodiment of the invention relates to the transfer of content between a host computer that issues OAS access requests and a block I/O storage system. Specifically, a host computer may issue an access request for a content unit that identifies the content unit is an object identifier. The request may be received by a second server, which may determine the block address(es) on the block I/O storage system at which the content unit is stored. A request may then be sent to the block I/O storage system to retrieve the content stored at the requested block address(es) and the block I/O storage system may return the content.

18 Claims, 6 Drawing Sheets

METHODS AND APPARATUS FOR ACCESSING CONTENT

CROSS-REFERENCE TO RELATED APPLICATIONS

This application is a continuation of prior application Ser. No. 11/474,658, filed on Jun. 26, 2006, entitled METHODS AND APPARATUS FOR ACCESSING CONTENT. Prior application Ser. No. 11/474,658, identified above, is incorporated by reference herein in its entirety.

BACKGROUND OF THE INVENTION

1. Field of Invention

The present invention relates to accessing stored content.

2. Discussion of Related Art

Virtually all computer application programs rely on storage that may be used to store computer code and data manipulated by the computer code. A typical computer system includes one or more host computers that execute such application programs and one or more storage systems that provide storage.

The host computers may access data by sending access requests to the one or more storage systems. Some storage systems require that the access requests identify units of data to be accessed using block addressing techniques that identify a logical volume in which the data is stored and the blocks within that logical volume where the data is located. Such storage systems are known as "block I/O" storage systems. Although the logical volumes presented by the storage system to the host may not map in a one-to-one manner to physical storage devices, they are perceived by the host as corresponding to physical storage devices, and the specification of a logical volume and block address specifies where the referenced data is physically stored within the storage system.

In contrast to block I/O storage systems, some storage systems receive and process access requests that identify a unit of data or other content unit using an object identifier, rather than an address that specifies where the data unit is physically or logically stored in the storage system. Such storage systems are referred to as object addressable storage (OAS) systems. In object addressable storage, a content unit may be identified (e.g., by host computers requesting access to the content unit) using an object identifier that is independent of the physical or logical location at which the content unit is stored (although it is not required to be independent). From the perspective of the host computer (or user) accessing a content unit on an OAS system, the object identifier does not control where the content unit is stored. Thus, in an OAS system, if the physical or logical location at which the unit of content is stored changes, the identifier by which host computers access the unit of content may remain the same. In contrast, in a block I/O storage system, if the physical or logical location at which the unit of content is stored changes, host computers accessing the unit of content may need to be made aware of the location change and then use the new physical or logical address of the unit of content for future accesses.

One type of an OAS system is a content addressable storage (CAS) system. In a CAS system, the object identifiers that identify content units are content addresses. A content address is an identifier that is computed, at least in part, from at least a portion of the content of its corresponding unit of content, which can be data and/or metadata. For example, a content address for a unit of content may be computed by hashing the unit of content and using the resulting hash value as the content address. Storage systems that identify content by a content address are termed content addressable storage (CAS) systems.

SUMMARY OF THE INVENTION

One embodiment of the invention is directed to a method for use in a computer system comprising a first server having at least one client application executing thereon, wherein the at least one client application comprises at least one interface that accesses content units using object identifiers for the content units, at least one storage system having a block input/output (block I/O) interface that receives block I/O addresses to identify storage locations thereon, and a second server that accepts object identifiers for content units and converts an accepted object identifier to at least one block I/O address to identify at least one storage location on the at least one storage system that stores the content unit identified by the object identifier. The method comprises acts of: (A) issuing, from the first server to the second server, at least one first object identifier for at least one first content unit; (B) receiving, at the first server, at least one first block I/O address from the second server, wherein the at least one first block I/O address identifies at least one first storage location on the at least one storage system that stores the at least one first content unit identified by the at least one first object identifier; and (C) issuing, from the first server to the at least one storage system, at least one request to access the at least one first storage location identified by the at least one first block I/O address. Another embodiment is directed to at least one computer readable medium encoded with instructions that, when executed on a computer system, perform the above-described method.

A further embodiment is directed to a first server that executes at least one client application comprising at least one interface that accesses content units using object identifiers for the content units, wherein the first server is usable in a computer system comprising the first server, at least one storage system having a block input/output (block I/O) interface that receives block I/O addresses to identify storage locations thereon, and a second server that accepts object identifiers for content units and converts an accepted object identifier to at least one block I/O address to identify at least one storage location on the at least one storage system that stores the content unit identified by the object identifier. The first server comprises: at least one output; at least one input; and at least one controller, coupled to the at least one output and at least one input, that: issues, via the at least one output, at least one first object identifier for at least one first content unit to the second server; receives, via the at least one input, at least one first block I/O address from the second server, wherein the at least one first block I/O address identifies at least one first storage location on the at least one storage system that stores the at least one first content unit identified by the at least one first object identifier; and issues, via the at least one output, at least one request to access the at least one first storage location identified by the at least one first block I/O address via the first storage system.

Another embodiment is directed to a method for use in a computer system comprising a first server having at least one client application executing thereon, wherein the at least one client application comprises at least one interface that accesses content units using object identifiers for the content units, at least one storage system having a block input/output (block I/O) interface that receives block I/O addresses to identify storage locations thereon, and a second server that accepts object identifiers for content units and converts an accepted object identifier to at least one block I/O address to identify at least one storage location on the at least one storage system that stores the content unit identified by the object identifier. The method comprises acts of: (A) receiving, at the second server, at least one request from the first server that comprises at least one first object identifier identifying at least one first content unit; and (B) returning, from the second server to the first server, at least one first block I/O address that identifies at least one first storage location on the at least one storage system that stores the at least one first content unit identified by the at least one first object identifier. A further embodiment is directed to at least one computer readable medium encoded with instructions that, when executed on a computer system, perform the above-described method.

Another embodiment is directed to a first server for use in a computer system comprising the first server, a second server having at least one client application executing thereon, wherein the at least one client application comprises at least one interface that accesses content units using object identifiers for the content units, at least one storage system having a block input/output (block I/O) interface that receives block I/O addresses to identify storage locations thereon, wherein the first server accepts object identifiers for content units and converts an accepted object identifier to at least one block I/O address to identify at least one storage location on the at least one storage system that stores the content unit identified by the object identifier. The first server comprises: at least one input; at least one output; and at least one controller, coupled to the at least one input and the at least one output, that: receives, via that at least one input, at least one request from the second server that comprises at least one first object identifier identifying at least one first content unit; and returns, to the second server via the at least one output, at least one first block I/O address that identifies at least one first storage location on the at least one storage system that stores the at least one first content unit identified by the at least one first object identifier.

A further embodiment is directed to a method for use in a computer system comprising a first server and at least one storage system, the first server having at least one client application executing thereon, wherein the at least one client application comprises at least one interface that accesses content units using object identifiers for the content units, the at least one storage system having a block input/output (block I/O) interface that receives block I/O addresses to identify storage locations thereon. The method comprises acts of: (A) issuing, from the first server, at least one write request to write at least one first content unit, wherein the at least one write request does not specify a block I/O address identifying any storage locations on the at least one storage system at which the at least one first content unit is to be stored; (B) receiving, at the first server, at least one first block I/O address that corresponds to at least one first storage location on the at least one storage system at which the at least one first content unit is stored in response to the at least one write request; and (C) issuing, from the first server, at least one read request to access the at least one first content unit, wherein the at least one read request comprises the at least one first block I/O address. Another embodiment is directed to at least one computer readable medium encoded with instructions that, when executed on a computer system, perform the above described method.

Another embodiment is directed to a first server usable in a computer system comprising the first server and at least one storage system, wherein the first server executes at least one client application that comprises at least one interface that accesses content units using object identifiers for the content units, wherein the at least one storage system has a block input/output (block I/O) interface that receives block I/O addresses to identify storage locations thereon. The first server comprises: at least one input; at least one output; and at least one controller, coupled to the at least one input and that the at least one output, that: issues, via the at least one output, at least one write request to write at least one first content unit, wherein the at least one write request does not specify a block I/O address identifying any storage locations on the at least one storage system at which the at least one first content unit is to be stored; receives, via the at least one input, at least one first block I/O address that corresponds to at least one first storage location on the at least one storage system at which the at least one first content unit is stored in response to the at least one write request; and issues, via the at least one output, at least one read request to access the at least one first content unit, wherein the at least one read request comprises the at least one first block I/O address.

A further embodiment is directed to a method for use in a computer system comprising a first server having at least one client application executing thereon, a storage environment, and at least one network that couples the storage environment to the first server. The method comprises acts of: (A) writing, from the first server, at least one first content unit to the storage environment via a first network port of the storage environment that is accessible to the first server via the at least one network and is a port through which the first server does not perform reads from the storage environment; and (B) reading, to the first server, the at least one first content unit from the storage environment via a second network port of the storage environment accessible to the first server via the at least one network, the second network port being different than the first network port and being a port through which the first server does not perform writes to the storage environment. Another embodiment is directed to at least one computer readable medium encoded with instructions that, when executed on a computer system, perform the above-described method.

A further embodiment is directed to a first server that executes at least one client application for use a computer system comprising the first sever, a storage environment, and at least one network that couples the storage environment to the first server. The first server comprises: a first network port; a second network port; and at least one controller, coupled to the first and second network ports, that: writes, via the first network port, at least one first content unit to the storage environment, where the first network port is a port through which the first server does not perform reads from the storage environment; and reads, via the second network port, the at least one first content unit from the storage environment, wherein the second network port is a port through which the first server does not perform writes to the storage environment.

Another embodiment is directed to a method for use in a computer system comprising a first server having at least one client application executing thereon, a storage environment, and at least one network that couples the storage environment to the first server. The method comprises acts of: (A) issuing, from the first server, at least one communication requesting a read of at least one first content unit from the storage environment, wherein the at least one communication is issued from a first network node of the first server that is accessible to the storage environment via the at least one network and comprises a request to provide the at least one first content unit to the first server via a second network node of the first server that is accessible to the storage environment via the at least one network, the second network node being different than the first network node; and (B) receiving, at the first server, the at least one first content unit from the storage environment via the at least one network and the second network node. A further embodiment is directed to at least one computer readable medium encoded with instructions that, when executed on a computer system, perform the above described method.

Another embodiment is directed to a first server that executes at least one client application, the first server being usable in a computer system comprising the first server, a storage environment, and at least one network that couples the storage environment to the first server. The first server comprises: a first network node; a second network node; and at least one controller, coupled to the first and second network node, that: issues at least one communication requesting a read of at least one first content unit from the storage environment, wherein the at least one communication is issued from the first network node of the client server that accessible to the storage environment via the at least one network, and wherein the communication comprises a request to provide the at least one first content unit to the first server via the second network node; and receives, via the second network node, the at least one first content unit from the storage environment.

A further embodiment is directed to a method for use in a computer system comprising a first server having at least one client application executing thereon, at least one storage system, a second server and at least one network. The method comprises acts of: (A) receiving, at the second server via the at least one network, at least one request from the first server to read at least one first content unit stored on the at least one storage system; and (B) issuing a request from the second server to the at least one storage system to: access the at least one first content unit; initiate a communication session with the first server through the at least one network; and return the at least one first content unit to the first server, rather than the second server, through the at least one network. Another embodiment is directed to at least one computer readable medium encoded with instructions that, when executed on a computer system, perform the above-described method.

A further embodiment is directed to a first server usable in a computer system comprising the first server, at least one storage system, a second server and at least one network. The first server comprises: at least one input; at least one output; and at least one controller coupled to the at least one input and the at least one output, that: receives, via the at least one input, at least one request from the second server to read at least one first content unit stored on the at least one storage system; and issues a request, via the output, to the at least one storage system to: access the at least one first content unit; initiate a communication session with the second server through the at least one network; and return the at least one first content unit to the second server, rather than the first server, through the at least one network.

Another embodiment is directed to a method for use in a computer system comprising a first server having at least one client application executing thereon, at least one storage system, a second server and at least one network. The method comprises acts of: (A) receiving, from the second server via the at least one network, at least one request to; and read at least one first content unit stored on the at least one storage system; initiate a communication session with the first server through the at least one network; and return the at least one first content unit to the first server, rather than the second server, through the at least one network; (B) in response to receipt of the at least one request, performing acts of; (B1) initiating, from the at least one storage system, the communication session with the first server through the at least one network; and (B2) returning the at least one first content unit to the first server, rather than the second server, through the at least one network. A further embodiment is directed to at least one computer readable medium encoded with instructions that, when executed on a computer system, perform the above-described method.

Another embodiment is directed to a storage system usable in a computer system comprising a first server having at least one client application executing thereon, the storage system, a second server and at least one network. The storage system comprises: at least one input; at least one output; at least one controller, coupled to the at least one input and the at least one output, that: receives, from the second server via the at least one network, at least one request to: read at least one first content unit stored on the at least one storage system; initiate a communication session with the first server through the at least one network; and return the at least one first content unit to the first server, rather than the second server, through the at least one network; in response to receipt of the at least one request: initiates, from the at least one storage system, the communication session with the first server through the at least one network; and returns the at least one first content unit to the first server, rather than the second server, through the at least one network.

A further embodiment is directed to a method for use in a computer system comprising a first server having at least one client application executing thereon, wherein the at least one client application comprises at least one interface that accesses content units using object identifiers for the content units, at least one storage system having a block input/output (block I/O) interface that receives block I/O addresses to identify storage locations thereon, and a second server that accepts requests to store content and provides at least one block I/O address to identify at least one storage location on the at least one storage system at which the content may be stored. The method comprises acts of: (A) issuing, from the first server to the second server, an indication that the first server has a content unit to be stored on the at least one storage system; (B) receiving, at the first server, at least one block I/O address from the second server, wherein the at least one block I/O address identifies at least one storage location on the at least one storage system at which the content unit is to be stored; (C) sending at least one write request to the at least one storage system to store the content unit to the at least one block I/O address; and (D) associating an object identifier with the content unit.

Another embodiment is directed to a method for use in a computer system comprising a first server having at least one client application executing thereon, wherein the at least one client application comprises at least one interface that accesses content units using object identifiers for the content units, at least one storage system having a block input/output (block I/O) interface that receives block I/O addresses to identify storage locations thereon, and a second server that accepts requests to store content and provides at least one block I/O address to identify at least one storage location on the at least one storage system at which the content may be stored. The method comprises acts of: (A) receiving, at the second server, at least one request from the first server that indicates that the first server has a content unit to be stored to the at least one storage system; (B) returning, from the second server to the first server, at least one first block I/O address that identifies at least one storage location on the at least one storage system at which the content unit is to be stored; and (C) associating an object identifier for the content unit with the at least one first block I/O address.

DETAILED DESCRIPTION

Object addressable storage (OAS) systems (including but not limited to content addressable storage (CAS) systems, examples of which are described in the patent applications listed below in Table 1, provide location independent access to content units stored thereon. That is, an entity accessing a content unit on an OAS system need not be aware of the physical or logical storage location of the content unit, but rather may access the content unit by providing an object identifier associated with the content unit to the OAS system. The assignee of the present application has developed systems wherein a software interface is used to provide object addressable storage, while employing the underlying storage resources of a non-OAS storage system (e.g., a block I/O storage system). This allows a user having a non-OAS storage system to obtain the benefits of OAS without having to purchase a new storage system dedicated to providing OAS storage. That is, a user who already owns a block I/O storage system may use a software OAS interface to enable the block I/O storage system to store content units accessible via an OAS interface.

The provision of an OAS interface in front of a block I/O storage system can be accomplished in any suitable way. Examples of such systems are described in the following U.S. patent applications listed below in Table 1 (each of which is incorporated herein by reference): Ser. Nos. 11/324,639; 11/324,728; 11/324,646; 11/324,644.

Figure 1:
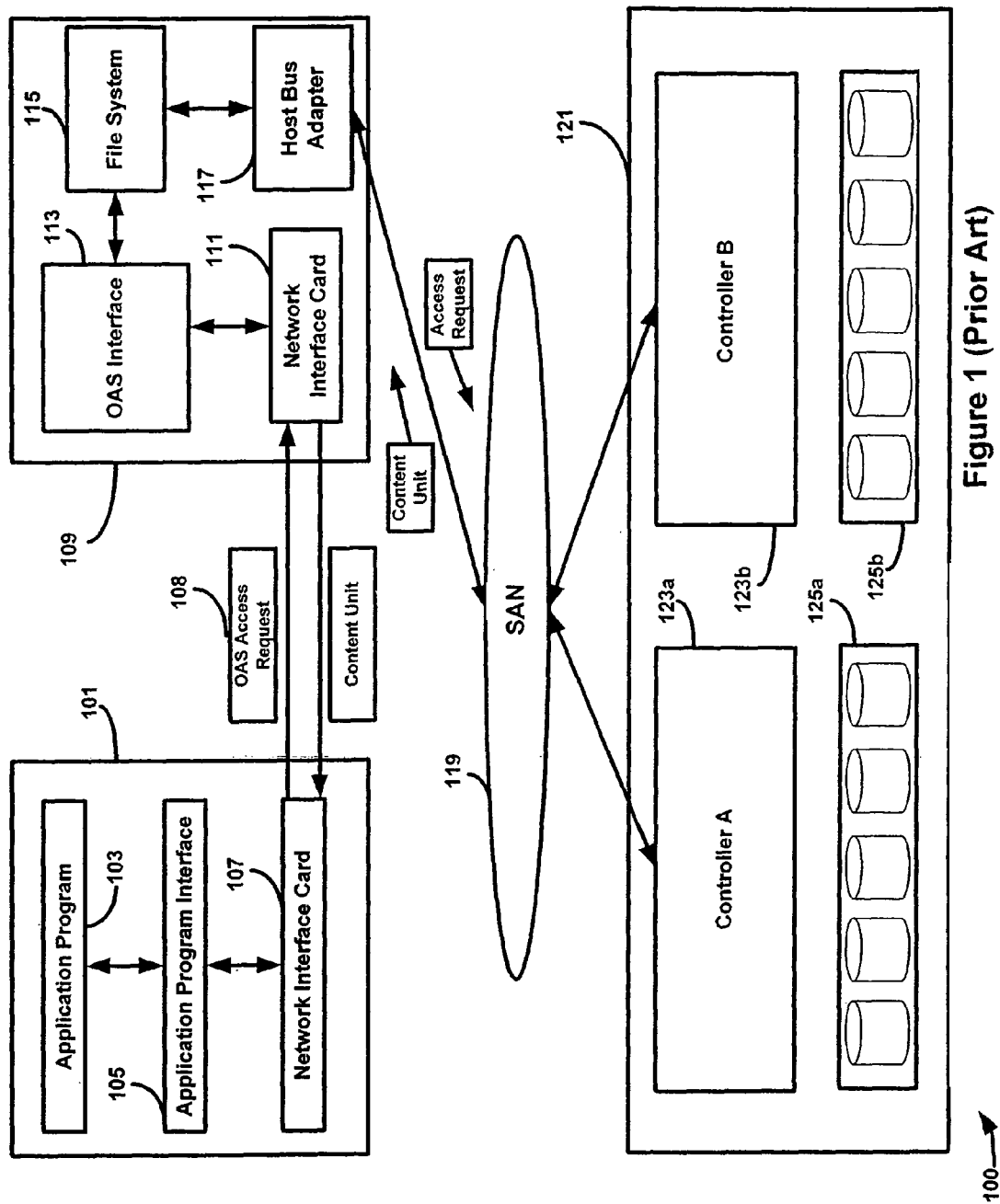
FIG. 1 is a block diagram of a computer system in which a host computer accesses data on a block I/O storage system using object addressable access requests.

One example of a system having an object addressable interface in front of a block I/O storage system is computer system 100 in FIG. 1. Computer system 100 includes a host computer 101, an OAS server 109, and a block I/O storage system 121. Host computer 101 executes an application program 103 and an application programming interface (API) 105. Application program 103 may generate access requests for content units and send these access requests to OAS server 109 via API 105. That is, application program 103 may communicate with OAS server 109 through API 105 (e.g., by calling various routines provided by API 105). Thus, application program 103 need not be aware of the communication protocol used by OAS server 109, but rather may use the routines provided by API 105 to access content that ultimately is stored on storage system 121. The access request generated by application program 103 and sent to OAS interface 109 may be an OAS access request. Unlike a block I/O request, an OAS access request identifies content units using an object identifier. The object identifier for a content unit, from the perspective of the application program and/or host computer issuing the access request does not specify where the content unit is physically or logically stored. Thus, for example, an OAS read request may identify the requested content unit by its object identifier, while a block I/O read request identifies the requested content using a block address that specifies where the content unit is logically (and/or physically stored). Similarly, an OAS write request need not specify the physical or logical storage location at which a content unit is to be written, whereas a block I/O write request does specify such a location.

API 105 may send an OAS access request 108 received from application program 103 to OAS server 109 via network interface card 107. Network interface card 111 of OAS server 109 may receive the access request and forward it to OAS interface 113.

In the example of FIG. 1, content units may be logically stored as files in a file system on OAS server 109 and physically stored on block I/O storage system 121. Thus, OAS server 109 includes a file system 115 that translates file system locations in the file system to block I/O storage addresses on storage system 121. As discussed in greater detail below, this block I/O storage address may be either a physical storage address or a logical storage address.

When OAS interface 113 receives a read request from host computer 101 that identifies a requested content unit by its object identifier, OAS interface 113 may determine the file system location in file system 115 of the file or files in which the requested content unit is stored (e.g., using its object identifier) and may access the file or files that stores the requested content unit. In response to OAS interface 113 accessing the file (or files), file system 115 may translate the file system location at which the file (or files) is stored into a block I/O storage address (either physical or logical) on block I/O storage system 121 and an access request may be sent to block I/O storage system 121 over storage area network (SAN) 119 via host bust adapter 117.

In the example of FIG. 1, block I/O storage system 121 includes two controllers (i.e., controller 123a and controller 123b) and two disk arrays (i.e., 125a and 125b). In some configurations, disk array 125a may be accessed via controller 123a, while disk array 125b may be accessed via controller 123b. Thus, an access request from OAS server 109 may be sent to either controller 123a or 123b, depending on which disk array stores requested content (i.e., in the case of a read request) or to which disk array the content is to be written (i.e., in the case of a write request). In some configurations, block I/O storage system 121 may protect against corruptions using redundant array of independent disks (RAID) technology. That is, disk arrays 125a and 125b may be RAID disk arrays. A RAID disk array is an array of physical storage devices (e.g., disks) that are combined into one logical unit. Thus, for example, in FIG. 1, instead of five different disk drives, controller 123a (which may implement the RAID functionality) presents a single logical unit number (LUN) to file system 115. RAID functionality also provides for the striping of data across multiple disks in the array and for the storage of parity information. That is, when processing a write operation, the content provided in the request may be striped across two or more disks in the array.

In addition, parity information may be computed for the content and stored on the disk array. The parity information is information that may be used to re-construct one or more corrupted bits of the content to be written. Thus, for example, when a content unit is written to a file in file system 115, file system 115 may determine a corresponding block address at which the content unit is to be stored. Because file system 115 views disk array 125a as a single logical unit, and not as a collection of five individual storage devices, this block address may be a logical address that does not directly map to the physical blocks or sectors on the disks of disk array at which the content of the content unit is ultimately stored. Controller 123a may map the logical block address used by the file system to a set of block addresses on the disks of disk array 125a across which the content of the content unit is striped.

Thus, when block I/O storage system 121 receives a read request from OAS server 109 it may access the content stored at the block address specified in the request and return the content stored at that address to file system 115 on OAS server 109. File system 115 may pass the content to OAS interface 113, which returns the content unit to host computer 101.

When OAS interface 113 receives a write request from host computer 101, it may create a file or files in file system 115 to store the content or may write the content to an existing file or files in file system 115. In response to OAS interface 113 creating a new file or modifying an existing file, file system 115 may translate the file system location at which the file (or files) is stored into a block I/O storage address (either physical or logical) on block I/O storage system 121 and an access request may be sent to block I/O storage system 121 over storage area network (SAN) 119 via host bust adapter 117 to store the content written by OAS interface at the block storage address. Block I/O storage system 121 may receive the access request, store the content at the block storage address indicated in the request, and may return an acknowledgment to file system 115 indicating that the content has been stored. In response, file system 115 may send an acknowledgement to OAS interface 113 indicating that the file or files has been successfully created or modified, and OAS interface may return an acknowledgment to host computer 101 indicating that the content unit has been successfully stored.

The system in FIG. 1 allows an application program executing on a host computer to access content on a block I/O storage system using OAS access requests. However, Applicants have appreciated that a drawback to the system 100 shown in FIG. 1 is that when a content unit is retrieved from block I/O storage system 121, the content unit is first transferred from block I/O storage system 121 to OAS server 109 and then from OAS server 109 to host computer 101. Thus, an OAS access request for a content unit may require the content unit to be transferred over the network two times (i.e., once from the block I/O storage system to the OAS server, and again from the OAS server to the host computer). Transferring content units twice over network connections increases latency from the time that a request for a content unit is issued until the time that the content unit is received. In addition, multiple network transfers creates additional network traffic and may be particularly problematic when the content units being transferred are large. Further, the additional transfer requires more processing resources (e.g., on OAS server 109) to be used.

Embodiments of the invention address this limitation by transferring content units between the block I/O storage system and the host computer, bypassing the OAS server. This may be done in any suitable way, as the invention is not limited in this respect.

In one embodiment, a computer system may include a first server that executes an application program which accesses content units using object identifiers, a block I/O storage system, and a second server that converts object identifiers to block I/O addresses. When a request for a content unit that identifies the content unit using an object identifier is sent from the first server to the second server, the second server may convert the object identifier to a block address or addresses which indicates the logical (and/or physical) storage location of the content unit on the block I/O storage system and may return the block address or addresses to the first server. The first server may then issue an access request to the block I/O storage system for the content unit using the block address received from the first server, and the block I/O storage system may return the content unit to the first server. Thus, rather than transferring the content unit through the OAS server in response to a read request for the content unit, the content unit can be transferred from the block I/O storage system to the host computer.

In another embodiment, the first server may issue OAS write requests to the OAS Server to store content units, receive a block I/O address at which the content units are stored, and subsequently issue read requests for the content units by sending block I/O requests for the content units to the block I/O storage system. In this manner, a content unit requested by the first server need not be transferred from the block I/O storage system to the OAS server, and then from the OAS server to the first server. Rather, the content unit may be transferred from the block I/O storage system to the first server without passing through the OAS server. This results in the first server writing content units through a first node (i.e., a network node, such as, for example, a network interface card, through which the first server communicates with the OAS server) and reading content unit through a second node (i.e., a network node, such as for example, a host bust adapter, through which the first server communicates with the block I/O storage system).

In another embodiment, the first server may issue an OAS read request to the second server via first network node and then act as a target at a second network node awaiting receipt of the requested content unit. The second server may issue a block I/O request to the storage system for the requested content unit, but instruct the storage system to return the content unit to the first server. This allows fewer transactions (i.e., the content unit may be transferred from the block I/O storage system to the first server without passing through the OAS server and the first server need not send a read request for the content unit to the block I/O storage system) which may reduce network traffic and latency in responding to access requests.

Figure 2:
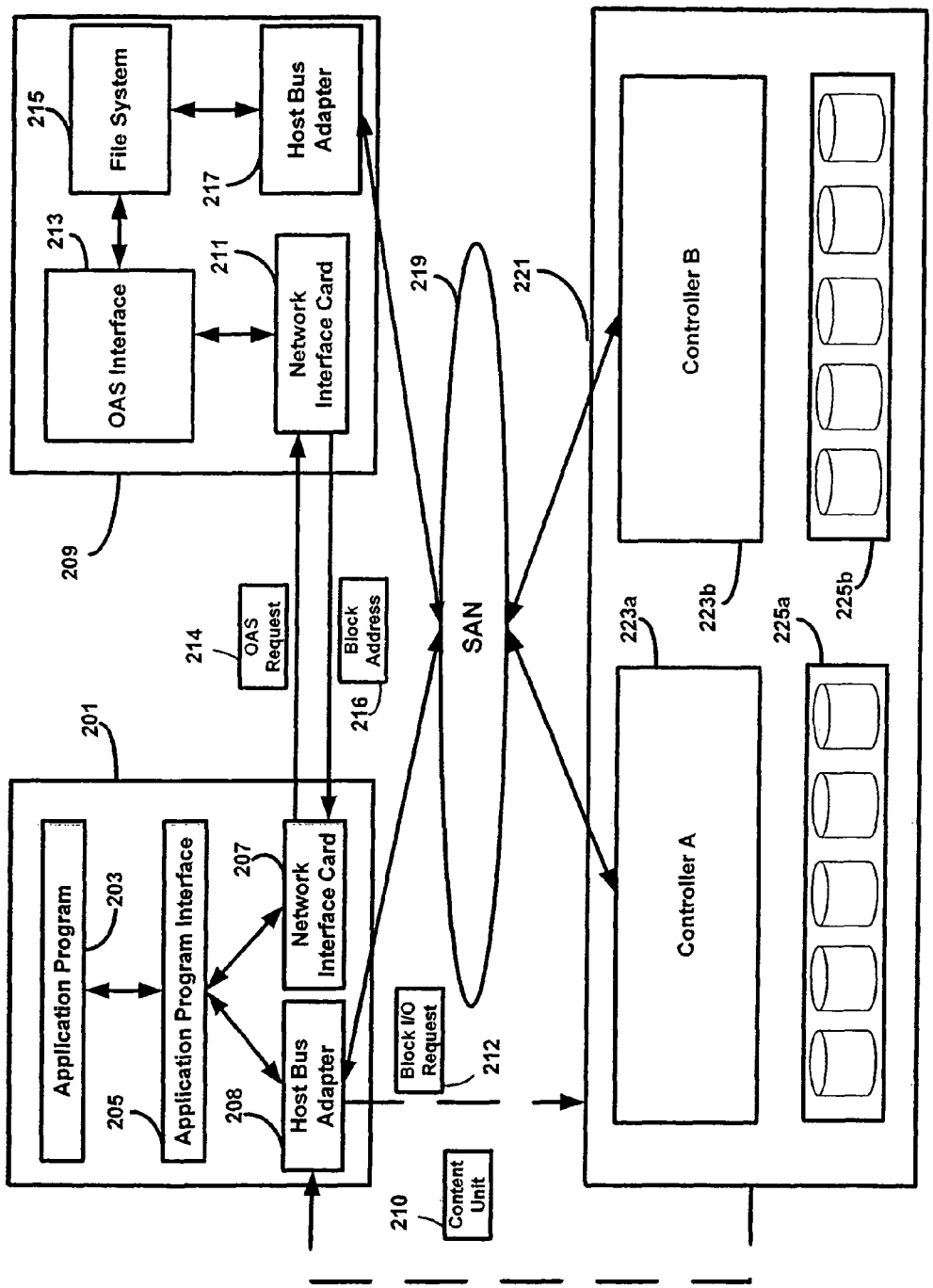
FIG. 2 is a block diagram of a computer system in which a host computer accesses data on a block I/O storage system using object addressable identifiers, but can also issue block I/O access requests directly to the block I/O storage system in accordance with one embodiment of the invention.

FIG. 2 illustrates a computer system wherein a storage system is provided that has an OAS interface but stores content units on a block I/O storage system, and where a host computer that accesses content unit via the OAS interface is also provided with the capability to access a content unit directly from the block I/O storage system, in accordance with one embodiment.

Computer system 200 includes a host computer 201, an OAS server 209, and a block I/O storage system 221. Host computer 201 may be any suitable type of computer, as the invention is not limited in this respect. For example, host computer 201 may be an application server, a personal computer (e.g., a desktop computer) or any other suitable type of computer programmed with an application program that accesses content units. Similarly, OAS server 209 may be any suitable type of computer, as the invention is not limited in this respect. For example, OAS server may be a server, an appliance, a personal computer, or any other suitable type of computer programmed to perform the functions of the OAS server described herein.

Host computer 201 and OAS server 209 may communicate with block I/O storage system 221 over storage area network (SAN) 219 using host bus adapters 208 and 217, respectively. Host computer 201 and OAS server 209 each also include a network interface card (i.e., network interface cards 207 and 211, respectively) that allow the host computer and the OAS server to communicate with each other via a general communication network (not shown), such as an IP network, separate from the SAN.

Block I/O storage system 221 may be any suitable type of block I/O storage system, as the invention is not limited in this respect. FIG. 2 shows a block I/O storage system having dual controllers and two disk arrays with a plurality of RAID disks. However, the invention is not limited to use with a block I/O storage system that employs two controllers, as the block I/O storage system may have any suitable number of controllers and any suitable number of disks or disk arrays. Further, block I/O storage system need not employ RAID techniques, as the invention is not limited in this respect.

Host bus adapters 208 and 217 and network interface cards 207 and 211 may be considered network nodes or network ports. As used herein, a network node or network port refers to a point at which a computer is coupled to the network. Because host computer 201 and OAS server 209 are coupled to SAN 219 at host bus adapters 208 and 217, respectively, these host bus adapters are considered network nodes. Similarly, host computer 201 and OAS server 209 are coupled to the general communication network at network interface cards 207 and 211, respectively. Thus, these network interface cards are also network nodes. Additionally, because the general communication network and SAN 219 are coupled to each other by host computer 101 and OAS server 119 (i.e., these computers are capable of transferring information from one network onto the other network), the general communications network and SAN 219 may be considered to be one network. Thus, the network in computer system 200 includes both SAN 219 and the general communication network.

In the examples described above, host computer 201 and OAS server 209 communicate with the block I/O storage system via the SAN and communicate with each other via a general communication network, such as an IP network. However, the invention is not limited in this respect, as host computer 201 and OAS server 209 need not use a SAN to communicate with the block I/O storage system, as any suitable type of connection may be used for such communication. Further, the host computer and OAS server need not use a general communication network to communicate with each other, as any suitable type of connection may be used, and the invention is not limited in this respect. In addition, the host computer and OAS server need not communicate with each other using a communication means separate from the communication means used to communicate with the block I/O storage system. For example, the host computer, OAS server, and block I/O storage system may each communicate with one another over the same network and need not use two separate networks (e.g., SAN 219 and the general communication network in FIG. 2).

In FIG. 2, host computer 201 may issue OAS access requests to OAS server 209 in any suitable way, as the invention is not limited in this respect. For example, application program 203 on host 201 may generate an access request and send the access request to application programming interface 205 (e.g., a described above in connection with FIG. 1), which may send the access request for a content unit to OAS server 209 via network interface card 207.

Figure 3:
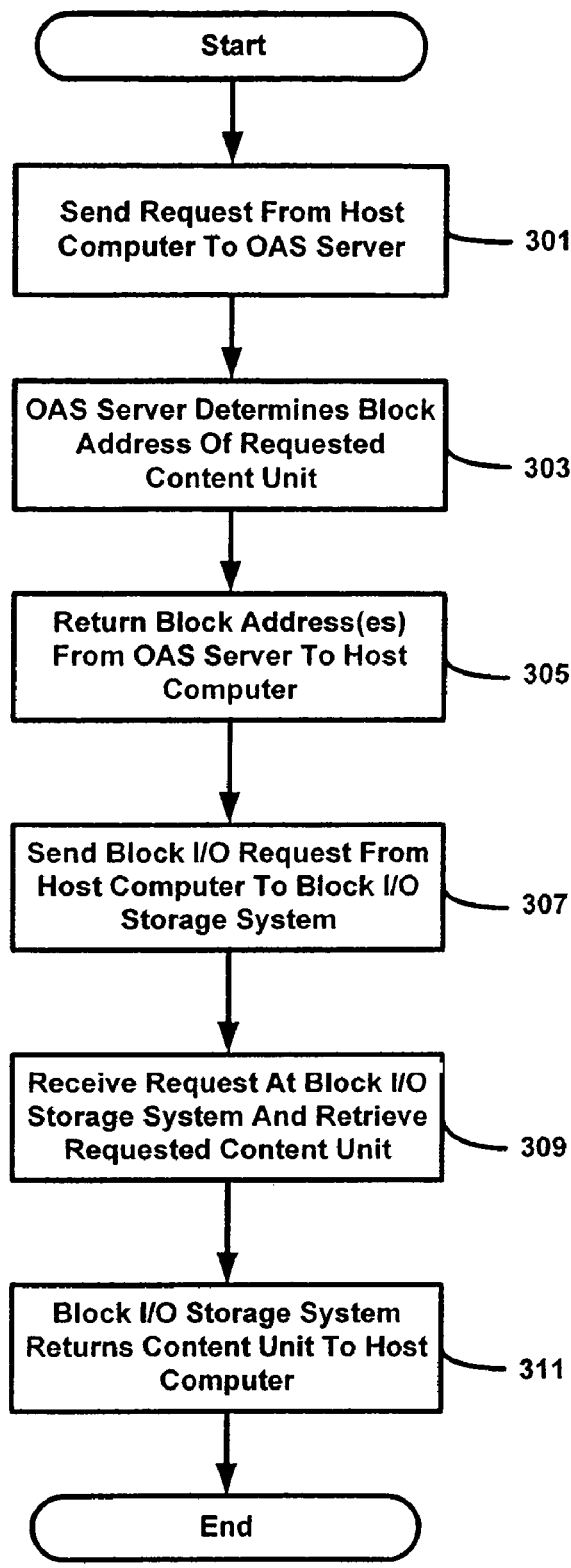
FIG. 3 is a flow chart showing an illustrative process for transferring content from a block I/O storage system to a host computer in response to an object addressable access request, in accordance with one embodiment.

FIG. 3 shows an illustrative process by which host computer 201 may read a content unit from storage system 221. The process begins at act 301 where application program 203 sends an access request to the application programming interface to read a content unit identified using an object identifier. Application program 203 may send the access request to application programming interface 205 in any suitable way, as the invention is not limited in this respect. In one embodiment, application programming interface 205 may present a set of routines that application program can call to initiate various communications with OAS server 209. Thus, the application program may send the access request for the content unit by calling one of the routines presented by the application programming interface. In response to receiving the access request from application program 203, application programming interface 205 may send OAS access request 214 to OAS server 209 via network interface card 207.

The process then continues to act 303, where network interface card 211 of OAS server 209 receives OAS access request 214 and passes the access request to OAS interface 213. OAS interface 213 determines the block address or addresses at which the requested content unit is stored on block I/O storage system 221. While two examples are provided below of the manner in which this may be done, it can be accomplished in any suitable way, as the invention is not limited in this respect.

In one embodiment, OAS interface 213 may obtain the block address at which a content unit is stored from file system 215. As described above, to store a content unit on block I/O storage system 221, OAS interface 213 may store the content in a file (either newly created or pre-existing) in file system 215. In response, the file system sends a request to store the content at one or more specified block addresses on block I/O storage system 221 and maintains a mapping between the location of the file in the file system and the block address(es) at which the content of the file is stored on block I/O storage system 221. That is, the file system maintains metadata that maps each file to its corresponding block addresses on the block I/O storage system.

Thus, OAS interface may determine the block address or addresses that store the content of a content unit by first determining the file(s) that stores the content of the requested content unit and its file system location. This may be done in any suitable way, as the invention is not limited in this respect. Examples of techniques for accomplishing this are described in the following applications listed in Table 1 below: Ser. Nos. 10/731,613; 10/731,796; 10/731,603; 10/731,845; 11/021,892; 11/022,022; 11/022,077; 11/021,756; 11/021,012; and 11/021,378. After determining the file system location of the file that stores the content unit, OAS interface may determine the block address or addresses at which the content of the file is stored. This may be done in any suitable way, as the invention is not limited in this respect. Techniques for doing this are described below. Additional techniques for doing this are also described in U.S. Pat. Nos. 6,324,581 and 6,542,909, each of which is incorporated herein by reference in its entirety.

In one embodiment, to determine the block address or addresses at which the content of a file is stored, the OAS interface may access the file system metadata to directly determine the block address or addresses at which the content of the content unit is stored.

In another embodiment, the OAS interface may determine the block address or addresses by sending a request to read the file to the file system and intercepting the request sent by the file system to the block I/O storage system for the blocks that store the file content. For example, after OAS interface 213 determines the file in file system 215 that stores the content of the content unit, OAS interface 213 may issue an access request for this file. The access request will cause file system 215 to determine the block address(es) on block I/O storage system 212 at which the content is stored and send an access request to block I/O storage system for the content unit. However, before the request is sent to the block I/O storage system, the request may be intercepted and the block address may be extracted from the request.

The request to the block I/O storage system may be intercepted in any suitable way, as the invention is not limited in this respect. For example, a driver may be inserted into the file system stack that intercepts block I/O access requests generated by the file system driver and extracts the block addresses from these requests.

Once the block address or addresses at which the content of the requested content unit is stored on block I/O storage system 221 are determined, the process continues to act 305, where OAS server 209 sends the block address(es) to host computer 201 in a response 216. The process then continues to act 307, where response 216 is received by application programming interface 205 on host computer 201. Application programming interface 205 then sends a block I/O read request 212 for the block address or addresses specified in response 216 to block I/O storage system 221 via host bus adapter 208 and SAN 219.

By providing the functionality to send block I/O read requests in the application programming interface, the application program is insulated from this aspect of retrieving a content unit. Thus, a pre-existing application program that issues OAS access requests need not be modified to receive one or more block addresses in response to a read request and issue a read request using the received block address(es) to the block I/O storage system. However, the invention is not limited in this respect, as the application program may handle the receipt of block addresses and issuance of block I/O read requests to the storage system.

In the example above, requests from the host computer to OAS server 209 are issued via network interface card 207 and requests from the host computer to block I/O storage system 221 are issued via host bus adapter 208. However, the invention is not limited in this respect, as all requests from host computer may use the same network node that provides access to both OAS server 209 and block I/O storage system 221.

The process then continues to act 309 where block I/O storage system 221 receives request 212 and retrieves the content stored at the block address(es) indicated in request 212. The process then continues to act 311, where the block I/O storage system returns the requested content unit 210 to host computer 201. The content unit may be received by host bus adapter 208 and passed to application programming interface 205, which may return the content unit to application program 203.

The embodiment described above is an illustrative example of one way in which a host computer having an application program that accesses content units via an OAS interface may read content from a block I/O storage system without passing the content through the OAS server.

The host computer may also store content units on block I/O storage system 221. This may be done in any suitable way, as the invention is not limited in this respect. For example, in one embodiment, application program 203 may send a write request to application programming interface 205 (e.g., by calling a routine presented by the application programming interface), wherein the request includes the content to be stored on the block I/O storage system. Application programming interface may send the request (including the content unit) to OAS server 209, which may translate the request to a block I/O request to store the content on block I/O storage system. This may be done in any suitable way, as the invention is not limited in this respect.

For example, when OAS interface 213 receives the write request, it may create a file or files in file system 215 to store the content or may write the content to an existing file or files in file system 215. In response to OAS interface 213 creating a new file or modifying an existing file, file system 215 may translate the file system location at which the file (or files) is stored into a block storage address (either physical or logical) on block I/O storage system 221 and an access request may be sent to block I/O storage system 221 over storage area network (SAN) 219 via host bust adapter 217 to store the content written by OAS interface at the block storage address(es). Block I/O storage system 221 may receive the access request, store the content at the block storage address indicated in the request, and may return to file system 215 an acknowledgment indicating that the content has been stored. In response, file system 215 may send an acknowledgement to OAS interface 213 indicating that the file (or files) has been successfully created or modified, and OAS interface may return an acknowledgment to host computer 201 indicating that the content unit has been successfully stored.

Thus, from the perspective of host computer 201, OAS server 209 and block I/O storage system 221 may be viewed as a single storage environment, which host computer 201 may access using multiple ports or nodes. That is, in one embodiment, network interface card 207 serves as one network port or network node and host bus adapter 208 serves a second network port or network node. In one embodiment, the system may be configured (e.g., via application programming interface 205 or otherwise) so that all write requests to the storage environment are sent to OAS server 209 via network interface card 207, such that network interface card may be viewed as write-only port through which OAS write requests are sent. Similarly, the system may be configured so that all read requests to the storage environment are sent to the block I/O storage system via host bus adapter 208, such that the host bus adapter may be viewed as a read-only port through which block I/O access requests are sent.

Figure 4:
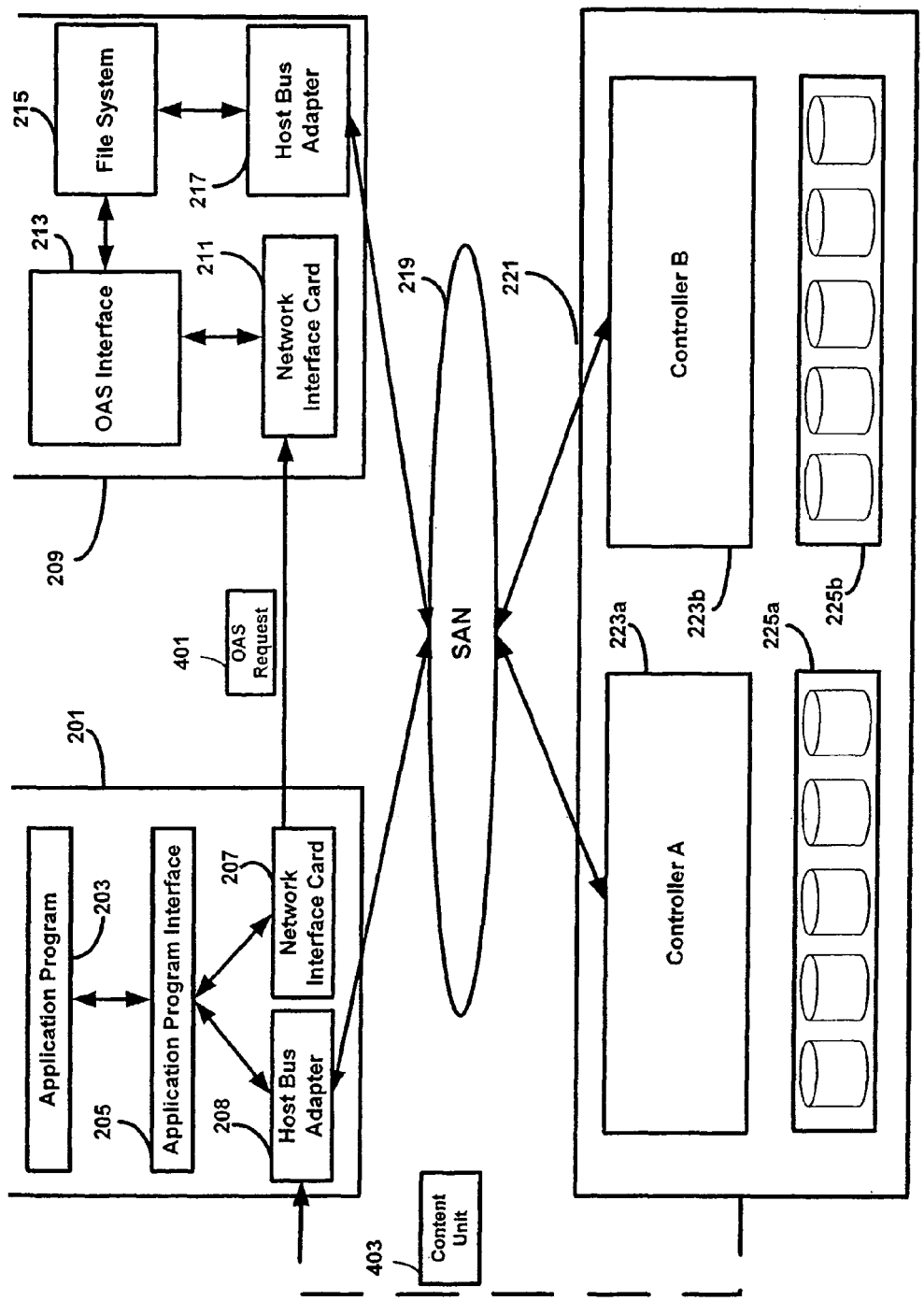
FIG. 4 is a block diagram of a computer system in which, in response to issuing an access request to an object addressable storage server, the host computer acts as a target awaiting a response directly from a block I/O storage system, in accordance with one embodiment.

In the embodiment described above, to read a content unit, host computer 201 issues two requests. First, the host computer issues a request to OAS server 209 to determine the block address at which the requested content unit is stored. Then, the host computer issues a read request to the block I/O storage system to access the content unit. In another embodiment, shown in FIG. 4, host computer 201 need not issue two separate access requests. Rather, host computer 201 may issue an access request for a content unit to OAS server 209 and receive the content unit from block I/O storage system 221 (rather than from the OAS server) without sending a separate request for the content unit to the block I/O storage system. This may be done in any suitable way, as the embodiment of the invention is not limited in this respect.

Figure 5:
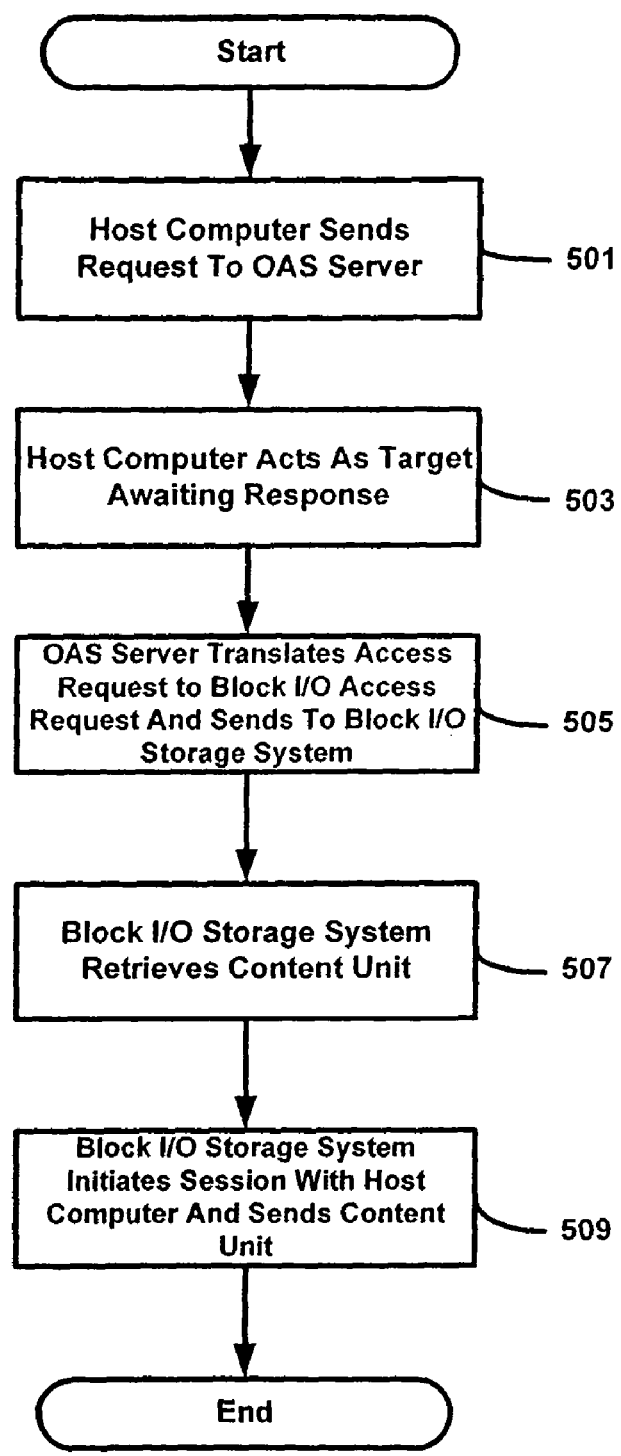
FIG. 5 is a flow chart showing an illustrative process by which a host computer, in response to issuing an access request to an object addressable storage server, acts as a target awaiting a response from a block I/O storage system, in accordance with one embodiment.

One illustrative process by which host computer 201 may read a content unit from block I/O storage system without sending a separate access request to the block I/O storage system is shown in FIG. 5. The process of FIG. 5 is but one example of a suitable process by which host computer 201 may read a content unit from the block I/O storage system without sending a separate access request to the block I/O storage system, as this can be implemented in other ways. The process begins at act 501, where application program 203 sends a read request for a content unit, identifying the content unit by an object identifier, to application programming interface 205. In one embodiment, the read request may specify the address of the host bus adapter (e.g., host bus adapter 208) to which the content unit will ultimately be sent. In response, application programming interface 205 sends a read request 401 to OAS server 209 (via network interface card 207) identifying the content unit using its object identifier. The read request may also include the address of host bus adapter 208.

The process then continues to act 503, where host computer 201 awaits receipt of the requested content unit from block I/O storage system 221. The process then continues to act 505, where OAS server 209 receives request 401 and translates the object identifier for the requested content unit to a block address or addresses at which the content unit is stored on block I/O storage system 221. This may be done in any suitable way (including any of the ways described above in connection with other embodiments), as the invention is not limited in this respect. For example, OAS server 209 may receive request 401 at network interface card 211, which forwards the request to OAS interface 213. OAS interface 213 may determine the file system location of the file in file system 215 that includes the content unit, and determine the one or more block addresses on block I/O storage system 221 at which the content in the file is stored. OAS interface 213 may then send a request to the block I/O storage system 221 (via host bus adapter 217 and SAN 219) to read the content of the block address or addresses at which the content unit is stored, but request that this content be returned not to the OAS server but to the host computer that initiated that access request. For example, the request may specify that the content be returned to the target address at the host computer 201 that was provided by the host in the read request to the OAS server. This may be accomplished in any suitable way, as the invention is not limited in this respect. For example, in embodiments in which OAS server 209 communicates with block I/O storage system 221 using the SCSI protocol, the SCSI request sent from OAS server 109 to block I/O storage system 221 may specify host bust adapter 208 of host computer 201 as the target address for the response to the request. This SCSI request may be an enhancement to a traditional vendor-supplied SCSI read request, or may be a new vendor-supplied read command that provides for specification of a target host bus adapter address.

The process then continues to act 507, where block I/O storage system 221 receives the request from OAS server 209 and retrieves the content from the specified block address or addresses. The process then continues to act 509, where block I/O storage system 221 initiates a communication session with host computer 201 via SAN 219 and host bus adapter 208 and sends the retrieved content as content unit 401 to the host computer. The content unit 401 may be received by the host computer (i.e., at host bus adapter 208) and passed to application programming interface 205, which returns the content unit to application program 203.

As discussed above, from the perspective of host computer 201, OAS server 209 and block I/O storage system 221 may be viewed as a single storage environment, to which host computer 201 has multiple ports or nodes. That is, network interface card 207 serves as one network port or network node and host bus adapter 208 serves as a second network port or network node. In the embodiment described above, host computer 201 sends read requests over one port or node (i.e., network interface card 207) and receives the response to the read request (i.e., the requested content unit) over another port or node.

In the embodiments described above, host computer 201 issues OAS access requests that identify content units using an object identifier. In some embodiments, the OAS access request may be a content addressable access request, and the identifiers that are used to identify content units may be content addresses that are based, at least in part, on at least a portion of (or all of) the content of the content unit that they identify. However, it should be appreciated that the embodiments of the invention described herein are not limited in this respect and the object identifier may be formed in any suitable way.

In the discussion above, aspects of the present invention are described in connection with an access request that reads a content unit. In another embodiment, similar techniques can be employed to enable host computer 201 to write content to block I/O storage system 221 without first sending the content to OAS system 209. Thus, host computer 201 may store content on the block I/O storage system without the content first being sent from the host computer to the OAS system and then from the OAS system to the block I/O storage system. This may be done in any suitable way, as this aspect of invention is not limited to any particular implementation technique.

Figure 6:
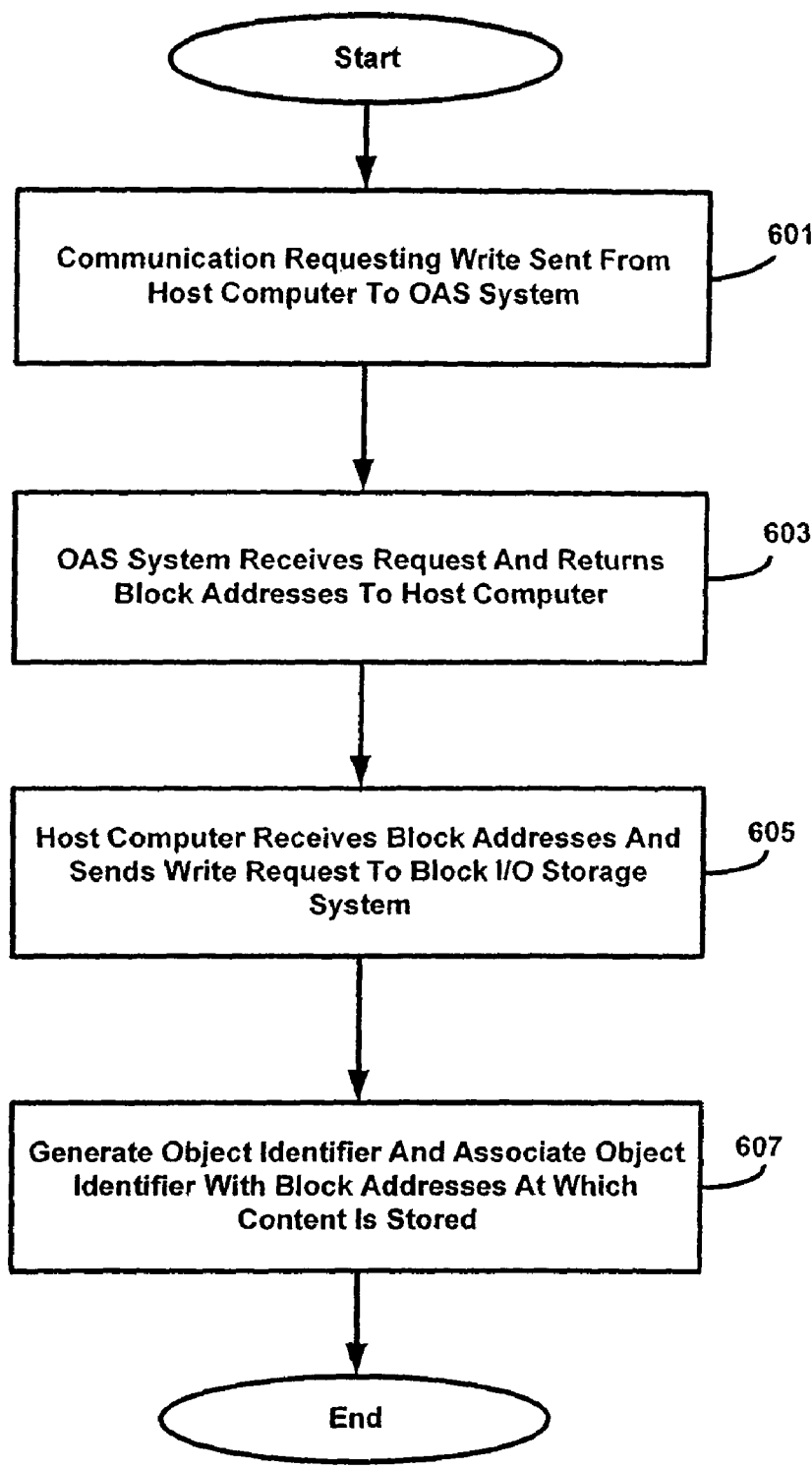
FIG. 6 is a flow chart showing an illustrative process for storing content on a block I/O storage system so that the content is later available via an object addressable access request.

One illustrative process for accomplishing this is shown in FIG. 6. The process begins at act 601 where, when application program 203 wishes to store content on block I/O storage system 221, a communication is sent from host computer 201 to OAS system 209 (e.g., via application programming interface 205 and network interface card 207) indicating that host computer 201 wishes to store content to block I/O storage system 221.

The process continues to act 603, where OAS system 209 receives the request from host computer 201 and returns block addresses of blocks on block I/O storage system 221 at which host computer 201 may write the data. If host computer 201 knows the size of the content to be written at the time the communication to OAS system 209 is sent, the size may be indicated in the communication, and OAS system 209 may use this information to determine the appropriate number of blocks to store the content, and may send the host computer the appropriate number of block addresses. For example, if host computer 201 indicates in the communication to OAS system 209 that it has 1536 bytes of content to store on block I/O storage system 221 and each block on block I/O storage system 221 stores 512 bytes, the OAS system may send a response that provides the addresses of three blocks to host computer 201. These blocks may be contiguous (e.g., volume 1, blocks 20-22) or non-contiguous. If the size of the content to be written to block I/O storage system 221 is not know at the time the request to OAS system 209 is sent (e.g., if the content to be written is to be streamed in from a source other than the source initiating the write request, such as another application program on the host computer or an entity outside of the host computer, and all of the content has not yet been streamed in), OAS system 209 may provide an initial number (e.g., a predetermined number) of block addresses at which the host computer may store the content on the block I/O storage system. As discussed below in more detail, if the number of block addresses provided by the OAS system is not sufficient to store all of the content, the host computer may send another request to the OAS system to provide additional block addresses. Alternatively, the host computer can indicate in the communication the size of the data content has been streamed in at the time when the host computer sends the request for block addresses to the OAS system and the OAS system may provide the appropriate number of block addresses to store the content that has been streamed in. The host computer may then issue subsequent requests when additional content is streamed in.

The process then continues to act 605, where host computer 201 receives the block addresses from OAS system 209 and sends a request to block I/O storage system to write the content to those block addresses. If the block addresses received from OAS system do not provide enough storage space to store all of the content (e.g., if the size of the content was unknown when the communication from host computer 201 to OAS system 209 was sent) then the process may return to act 601, where host computer 201 may request more storage space, and may then continue to acts 603 and 605 where OAS system may provide additional block addresses to host computer 201 and host computer 201 may write the content to the block I/O storage system at the addresses provided by the OAS system 209. Acts 601, 603, and 605 may be repeated until all the content is written to the block I/O storage system.

The process then continues to act 607, where an object identifier for the content stored on the block I/O storage system is generated and OAS system 209 associates the object identifier with the block addresses on block I/O storage system 221 at which the content is stored. In addition, host computer 201 may associate the object identifier with the stored content (e.g., by associating the object identifier with metadata that describes the stored content) so that it may later use the object identifier to access the content.

The object identifier may be generated by any suitable entity and in any suitable way, as the invention is not limited in this respect. For example, the object identifier may be generated by the host computer or the OAS system 209. In embodiments in which the object identifier is generated by the host computer, then after generating the object identifier, the host computer may provide it to the OAS system so that the OAS system may associate with the block addresses so that the OAS system may respond to future read requests for the content that identify the content using the object identifier. The OAS system may associate the content address with the block addresses to which the content was written in any suitable way, as the invention is not limited in this respect. For example, OAS system may create a file in a file system (e.g., file system 215) and associate the object identifier with the file. The OAS system may modify the metadata associated with the file to indicate that the content of the file is stored at the block addresses on the block I/O storage system that the OAS system provided to the host computer, and to which the host computer wrote the content. Thus, on subsequent OAS read requests to access the content (and that identify the content by its object identifier), the OAS system may locate the file and access the file, causing the file system to retrieve the content from the block I/O storage system. In embodiments in which the OAS system is a CAS system and the object identifier is a content address that is computer, at least in part, from at least a portion of the content that it identifies, the host computer may generate the content address using the content because it has access to the content, and may provide the content address to the OAS system.

Alternatively, in embodiments in which the object identifier is generated by the OAS system, the OAS system may provide the object identifier to the host computer so that the host computer may associate it with the content unit to enable the host computer to later use the object identifier to read the content from the storage system using the object identifier.

The process of FIG. 6 is but one example of a suitable way for a host computer to write content to a block I/O storage system without first sending the content through an OAS system. The invention is not limited to this particular process as any suitable process may be used. Further, the process of FIG. 6 may be used in any suitable computer system and is not limited to use in the computer system of FIG. 2.

The above-described embodiments of the present invention can be implemented on any suitable computer or system. Examples of suitable computers and/or systems are described in the patent applications listed below in Table 1 (collectively "the OAS applications"), each of which is incorporated herein by reference. It should be appreciated that the computers and systems described in these applications are only examples of computers and systems on which the embodiments of the present invention may be implemented, as the embodiments of the invention described herein are not limited to implementation on any of these types of storage systems, and are not limited to use with content addressable storage systems.

TABLE 1

| Title | Ser. No. | Filing Date |
|---|---|---|
| Content Addressable Information, Encapsulation, Representation, And Transfer | 09/236,366 | Jan. 21, 1999 |
| Access To Content Addressable Data Over A Network | 09/235,146 | Jan. 21, 1999 |
| System And Method For Secure Storage Transfer And Retrieval Of Content Addressable Information | 09/391,360 | Sep. 7, 1999 |
| Method And Apparatus For Data Retention In A Storage System | 10/731,790 | Dec. 9, 2003 |
| Methods And Apparatus For Facilitating Access To Content In A Data Storage System | 10/731,613 | Dec. 9, 2003 |
| Methods And Apparatus For Caching A Location Index In A Data Storage System | 10/731,796 | Dec. 9, 2003 |
| Methods And Apparatus For Parsing A Content Address To Facilitate Selection Of A Physical Storage Location In A Data Storage System | 10/731,603 | Dec. 9, 2003 |
| Methods And Apparatus For Generating A Content Address To Indicate Data Units Written To A Storage System Proximate In Time | 10/731,845 | Dec. 9, 2003 |
| Methods And Apparatus For Modifying A Retention Period For Data In A Storage System | 10/762,044 | Jan. 21, 2004 |
| Methods And Apparatus For Extending A Retention Period For Data In A Storage System | 10/761,826 | Jan. 21, 2004 |
| Methods And Apparatus For Indirectly Identifying A Retention Period For Data In A Storage System | 10/762,036 | Jan. 21, 2004 |
| Methods And Apparatus For Indirectly Identifying A Retention Period For Data In A Storage System | 10/762,043 | Jan. 21, 2004 |
| Methods And Apparatus For Increasing Data Storage Capacity | 10/787,337 | Feb. 26, 2004 |
| Methods And Apparatus For Storing Data In A Storage Environment | 10/787,670 | Feb. 26, 2004 |

TABLE 1-continued

| Title | Ser. No. | Filing Date |
|---|---|---|
| Methods And Apparatus For Segregating A Content Addressable Computer System | 10/910,985 | Aug. 4, 2004 |
| Methods And Apparatus For Accessing Content In A Virtual Pool On A Content Addressable Storage System | 10/911,330 | Aug. 4, 2004 |
| Methods and Apparatus For Including Storage System Capability Information In An Access Request To A Content Addressable Storage System | 10/911,248 | Aug. 4, 2004 |
| Methods And Apparatus For Tracking Content Storage In A Content Addressable Storage System | 10/911,247 | Aug. 4, 2004 |
| Methods and Apparatus For Storing Information Identifying A Source Of A Content Unit Stored On A Content Addressable System | 10/911,360 | Aug. 4, 2004 |
| Software System For Providing Storage System Functionality | 11/021,892 | Dec. 23, 2004 |
| Software System For Providing Content Addressable Storage System Functionality | 11/022,022 | Dec. 23, 2004 |
| Methods And Apparatus For Providing Data Retention Capability Via A Network Attached Storage Device | 11/022,077 | Dec. 23, 2004 |
| Methods And Apparatus For Managing Storage In A Computer System | 11/021,756 | Dec. 23, 2004 |
| Methods And Apparatus For Processing Access Requests In A Computer System | 11/021,012 | Dec. 23, 2004 |
| Methods And Apparatus For Accessing Information In A Hierarchical File System | 11/021,378 | Dec. 23, 2004 |
| Methods And Apparatus For Storing A Reflection On A Storage System | 11/034,613 | Jan. 12, 2005 |
| Method And Apparatus For Modifying A Retention Period | 11/034,737 | Jan. 12, 2005 |
| Methods And Apparatus For Managing Deletion of Data | 11/034,732 | Jan. 12, 2005 |
| Methods And Apparatus For Managing The Storage Of Content | 11/107,520 | Apr. 15, 2005 |
| Methods And Apparatus For Retrieval Of Content Units In A Time-Based Directory Structure | 11/107,063 | Apr. 15, 2005 |
| Methods And Apparatus For Managing The Replication Of Content | 11/107,194 | Apr. 15, 2005 |
| Methods And Apparatus For Managing the Storage Of Content In A File System | 11/165,104 | Jun. 23, 2005 |
| Methods And Apparatus For Accessing Content Stored In A File System | 11/165,103 | Jun. 23, 2005 |
| Methods And Apparatus For Storing Content In A File System | 11/165,102 | Jun. 23, 2005 |

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments of the present invention comprises at least one computer-readable medium (e.g., a computer memory, a floppy disk, a compact disk, a tape, etc.) encoded with a computer program (i.e., a plurality of instructions), which, when executed on a processor, performs the above-discussed functions of the embodiments of the present invention.

The computer-readable medium can be transportable such that the program stored thereon can be loaded onto any computer environment resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

It should be appreciated that in accordance with several embodiments of the present invention wherein processes are implemented in a computer readable medium, the computer implemented processes may, during the course of their execution, receive input manually (e.g., from a user).

The phraseology and terminology used herein is for the purpose of description and should not be regarded as limiting. The use of "including," "comprising," "having," "containing," "involving," and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method for use in a computer system, comprising:
receiving, at a second server, at least one storage access request from a first server that indicates that the first server has a content unit to be stored to at least one storage system, wherein the content unit is associated with an object identifier in the at least one storage access request from the first server, and wherein the object identifier identifies the content unit independently of at least one storage location on the at least one storage system at which the content unit is to be stored, wherein the at least one storage access request sent from the first server is different than a write request sent from the first server and does not include the content unit to be stored to the at least one storage system;
in response to the at least one storage access request, returning, from the second server to the first server, at least one first block I/O address that identifies the at least one storage location on the at least one storage system at which the content unit is to be stored; and
associating the object identifier for the content unit with the at least one first block I/O address.

2. The method of claim 1, where the object identifier is a content address generated at least partially based on the content of the content unit.

3. The method of claim 1, where in the at least one storage access request includes a size of the content unit to be stored on the at least one storage system.

4. The method of claim 3, wherein the at least one storage location identified by the at least one block address includes a number of storage locations, and wherein the number of storage locations identified by the at least one block address depends on the indication of the size of the content unit.

5. The method of claim 1, wherein associating an object identifier with the content unit further includes receiving the object identifier from the first server.

6. The method of claim 1, wherein the object identifier is generated at the second server.

7. At least one non-transitory computer readable medium encoded with instructions that when executed on a computer system perform a method comprising:
   receiving, at a second server, at least on storage access request form a first server that indicates that the first server has a content unit to be stored to at least one storage system, wherein the content unit is associated with an object identifier in the at least one storage access request from the first server, and wherein the object identifier identifies the content unit independently of a at least one storage location on the at least one storage system at which the content unit is to be stored, wherein the at least one storage access request sent from the first server is different than a write request sent from the first server and does not include the content unit to be stored to the at least one storage system;
   in response to the at least one storage access request, returning, from the second server to the first server, at least one first block I/O address that identifies the at least one storage location on the at least one storage system at which the content unit is to be stored; and
   associating the object identifier for the content unit with the at least one first block I/O address.

8. The at least one non-transitory computer readable medium of claim 7, where the object identifier is a content address generated at least partially based on the content of the content unit.

9. The at least one non-transitory computer readable medium of claim 7, where in the at least one storage access request includes a size of the content unit to be stored on the at least one storage system.

10. The at least one non-transitory computer readable medium of claim 9, wherein the at least one storage location identified by the at least one block address includes a number of storage locations, and wherein the number of storage locations identified by the at least one block address depends on the indication of the size of the content unit.

11. The at least one non-transitory computer readable medium of claim 7, wherein associating an object identifier with the content unit includes receiving the object identifier from the first server.

12. The at least one non-transitory computer readable medium of claim 7, wherein the object identifier is generated at the second server.

13. A server, comprising:
   a processor and a memory;
   at least one interface that accepts requests to store content and provides at least one block I/O address to identify at least one storage location on at least one storage system at which content may be stored; and
   at least one controller that:
   receives at least one storage access request from a different server that indicates that a content unit on the different server is to be stored to the at least one storage system, wherein the content unit is associated with an object identifier in the at least one storage access request from the different server, and wherein the object identifier identifies the content unit independently of at least one storage location on the at least one storage system at which the content unit is to be stored, wherein the at least one storage access request sent from the different server is different than a write request sent from the different server and does not include the content unit to be stored to the at least one storage system;
   in response to the at least one storage access request, returns at least one first block I/O address that identifies the at least one storage location on the at least one storage system at which the content unit is to be stored; and
   associates the object identifier for the content unit with the at least one first block I/O address.

14. The server of claim 13, where the object identifier is a content address generated at least partially based on the content of the content unit.

15. The server of claim 13, where in the at least one storage access request includes a size of the content unit to be stored on the at least one storage system.

16. The server of claim 15, wherein the at least one storage location identified by the at least one block address includes a number of storage locations, and wherein the number of storage locations identified by the at least one block address depends on the indication of the size of the content unit.

17. The server of claim 13, wherein the at least one controller receives the object identifier from the different server.

18. The server of claim 13, wherein the at least one controller generates the object identifier.

* * * * *